(12) United States Patent
Faure

(10) Patent No.: US 8,890,687 B2
(45) Date of Patent: Nov. 18, 2014

(54) METHOD OF DETECTING AN ABNORMAL ENVIRONMENTAL OPERATING CONDITION OF AN ELEMENT EMBEDDED IN AN APPARATUS AND CORRESPONDING ELEMENT

(75) Inventor: Frédéric Faure, Cassis (FR)

(73) Assignee: Gemalto SA, Meudon (FR)

( * ) Notice: Subject to any disclaimer, the term of this patent is extended or adjusted under 35 U.S.C. 154(b) by 73 days.

(21) Appl. No.: 13/695,186

(22) PCT Filed: Apr. 22, 2011

(86) PCT No.: PCT/EP2011/056506
§ 371 (c)(1),
(2), (4) Date: Feb. 6, 2013

(87) PCT Pub. No.: WO2011/134918
PCT Pub. Date: Nov. 3, 2011

(65) Prior Publication Data
US 2013/0135100 A1    May 30, 2013

(30) Foreign Application Priority Data

Apr. 30, 2010 (EP) ..................................... 10305469

(51) Int. Cl.
| G08B 21/00 | (2006.01) |
| G07C 3/00 | (2006.01) |
| G08B 21/18 | (2006.01) |
| H04Q 9/02 | (2006.01) |

(52) U.S. Cl.
CPC *G08B 21/18* (2013.01); *G07C 3/00* (2013.01); *H04Q 2209/40* (2013.01); *H04Q 9/02* (2013.01); *G08B 21/187* (2013.01); *H04Q 2209/823* (2013.01)
USPC ................. 340/540; 340/870.17; 340/426.13; 340/426.24; 340/7.51; 702/131; 702/179; 702/182

(58) Field of Classification Search
CPC ..................................................... G02B 21/187
USPC ......... 340/540, 870.17, 426.13, 426.24, 7.51; 702/131, 179, 182
See application file for complete search history.

(56) References Cited

U.S. PATENT DOCUMENTS

| 8,160,836 B2* | 4/2012 | Pompei et al. ................. 702/131 |
| 2004/0041714 A1* | 3/2004 | Forster ..................... 340/870.17 |
| 2005/0038579 A1 | 2/2005 | Lewis |
| 2008/0270076 A1 | 10/2008 | Breed |

FOREIGN PATENT DOCUMENTS

| WO | WO 2008/016339 A1 | 2/2008 |
| WO | WO 2010/037425 A1 | 4/2010 |

OTHER PUBLICATIONS

International Search Report (PCT/ISA/210) Issued on Sep. 8, 2011, by the European Patent Office as the International Searching Authority for International Application No. PCT/EP2011/056506.

* cited by examiner

*Primary Examiner* — Tai T Nguyen
(74) *Attorney, Agent, or Firm* — Buchanan Ingersoll & Rooney PC

(57) ABSTRACT

A method of detecting an abnormal environmental operating condition of an element embedded in an apparatus. The element is able to communicate with a telecommunications network. The method includes cyclically measuring at least one environmental operating parameter of the element, detecting that the element is operating for an excessive duration in at least one reference operating span and transmitting an alert message to the telecommunications network if the element has operated for an excessive duration in the reference operating span.

12 Claims, 1 Drawing Sheet

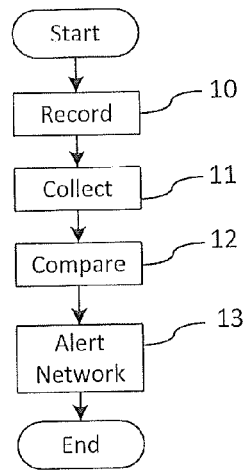
Fig. 1
| [-50°C,-40°C[ | [-40°C,-30°C[ | [-30°C,-20°C[ | [-20°C,-10°C[ | [-10°C,0°C[ | [0°C,10°C[ | [10°C,20°C[ | [20°C,30°C[ | [30°C,40°C[ |
|---|---|---|---|---|---|---|---|---|
| D1 | D2 | D3 | D4 | D5 | D6 | D7 | D8 | D9 |
| [40°C,50°C[ | [50°C,60°C[ | [60°C,70°C[ | [70°C,80°C[ | [80°C,90°C[ | [90°C,100°C[ | [100°C,110°C[ | [110°C,120°C[ |
|---|---|---|---|---|---|---|---|
| D10 | D11 | D12 | D13 | D14 | D15 | D16 | D17 |
Fig. 2
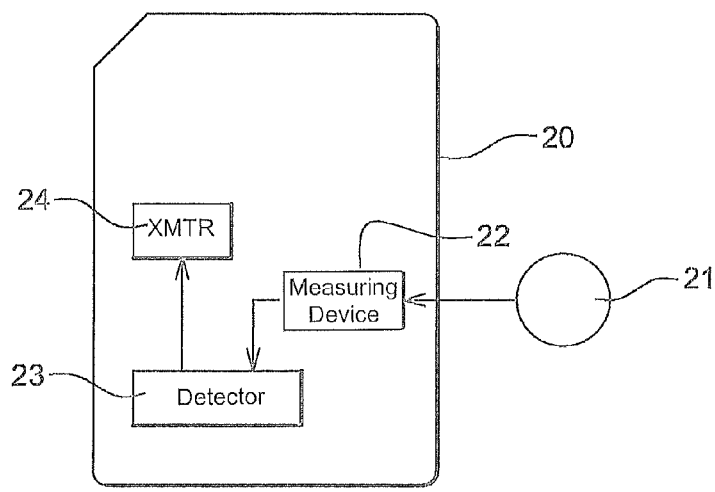
Fig. 3

METHOD OF DETECTING AN ABNORMAL ENVIRONMENTAL OPERATING CONDITION OF AN ELEMENT EMBEDDED IN AN APPARATUS AND CORRESPONDING ELEMENT

Method of detecting an abnormal environmental operating condition of an element embedded in an apparatus and corresponding element

BACKGROUND OF THE INVENTION

1. Field of the Invention

The invention relates to the field of telecommunications. Specifically, the present invention relates to a method for detecting an abnormal environmental operating condition of an element embedded in an apparatus, said element being able to communicate with a telecommunications network.

The invention has a specific application in the field of machine-to-machine (M2M) communication.

2. Description of the Related Art

Said machines—in the broad sense of the term—are typically appliances, vehicles, packaging systems, everyday objects, public spaces, as well as trees, areas liable to flooding, forests, domestic or wild animals, etc. For example, a manufacturer of instruments for oil and gas production uses M2M to enable its customers remotely to gather data regarding flow rates, pressures, temperatures and tank and equipment levels. A manufacturer of injection pumps for wells uses M2M to offer its customers a means for remotely adjusting the operation of the pump (according to weather conditions). This does away with the need to perform adjustments on the site.

In a known manner, a security element such as a SIM, USIM, ISIM or URIM card can be used to provide communication between machines. Said SIM cards are connected to mobile telephone elements in order to be able to communicate over the radio waves with remote devices of a telecommunications network.

Such a card can be in conventional plug-in format (format ID-00) or be provided in the form of a reinforced plug-in (for example made of ABS, PET or resin) or even in the form of an integrated circuit intended for being soldered onto a printed circuit board or for being inserted in a suitable reader.

The card or integrated circuit contains a conventional telephone chip, such as those used in GSM, UMTS, HSPA, LTE or CDMA terminals, or else a chip that has been designed specifically for M2M.

A manufacturer of SIM cards or integrated circuits for M2M, hereinafter referred to as elements, guarantees the operation of these elements under specific environmental conditions to its customer. An M2M element is indeed subjected to operating conditions which may be harsh and limit the useful life thereof. For example, the number of deletion/writing cycles of any of its records is guaranteed within a certain span of operating temperatures. A large number of deletion/writing cycles fatigue the chip, as does operation at extreme temperatures. When said chips are embedded, for example, in vehicles, they are additionally subjected to vibrations and accelerations which reduce the operating duration thereof (vibrations can lead to poor contact when the cards are insertable—and thus not soldered—and the accelerations are generally caused by crashes).

Likewise, an excessive moisture rate may damage the cards due to the appearance of rust on the contacts thereof or on the connectors of the associated reader.

In order to extend the useful life of the cards, element manufacturers are developing specific operating systems which distribute the wear of the memory over almost all of the memory. In order to guard against vibrations, accelerations and moisture—in other words environmental conditions—it is essential to select a suitable shape factor (integration of the chip in a specific housing, for example, or integration of said chip in an integrated circuit which can be soldered).

The drawback of current M2M systems is that while a chip has not exceeded the useful life guaranteed by the manufacturer, it is difficult to identify the reason for its early failure. For the manufacturer of the chip or the element, it is particularly desirable to be able to modulate the conditions of the warranty it offers to its customers in accordance with the use of the element that includes the chip.

Thus, it is necessary to facilitate the analysis of the environmental conditions under which a chip is used.

SUMMARY OF THE INVENTION

The present invention mainly aims to provide such a solution.

For said purpose, the present invention provides a method for detecting an abnormal environmental operating condition of an element embedded in an apparatus, said element being able to communicate with a telecommunications network, the method comprising the steps of:
  cyclically measuring at least one environmental operating parameter of said element;
  detecting that the element is operating for an excessive duration in at least one reference operating span;
  transmitting an alert message to the telecommunications network if the element has operated for an excessive duration in the reference operating span.

In a preferred embodiment of the invention, the alert message is transmitted automatically by the element.

In another optionally complementary embodiment, the alert message is transmitted at the request of the network.

The element is preferably a security element of the telecommunications network, such as a SIM card or the like.

In an advantageous embodiment, the element is connected to an environmental sensor.

In another embodiment, the element includes an environmental sensor.

The environmental sensor can be a temperature, pressure, acceleration or hygrometry sensor.

The method of the invention is advantageously implemented in an M2M environment.

The reference operating span and/or the duration after which it can be considered that the element is operating for an excessive duration are preferably updated OTA in the element. The triggering element can be an update of the rules by the operator or else an alert emitted by the card (for example upon reaching the maximum number of cycles).

The invention also relates to an element for detecting an abnormal environmental operating condition of said element, the element being embedded in an apparatus and able to communicate with a telecommunications network, said element including:
  a means for cyclically measuring at least one environmental operating parameter of said element;
  a means for detecting that the element is operating for an excessive duration in at least one reference operating span;
  a means for transmitting an alert message to the telecommunications network, the transmission means being activated if the element has operated for an excessive duration in said reference operating span.

BRIEF DESCRIPTION OF THE DRAWINGS

Further characteristics and advantages of the invention will appear from reading the following description of a preferred embodiment thereof, provided as an illustrative example in a non-limiting manner, and the appended drawings, in which:

FIG. 1 represents schematically the operation of the method according to the invention;

FIG. 2 represents a table such as generated by the element according to the invention;

FIG. 3 shows an element according to the present invention.

DETAILED DESCRIPTION OF THE DRAWINGS

The invention proposes monitoring variations in an environmental operating condition of an M2M element. For said purpose, the present invention proposes combining said element with at least one sensor—for example a temperature, pressure, acceleration or even hygrometry sensor—which is responsible for taking environmental measurements which are then stored in said element. The sensor can be built into the element or connected to the latter and communicate with the element by means of, for example, the SWP or GPIO standards.

The principle of the invention consists of detecting an abnormal environmental operating condition of an element embedded in an apparatus, said element being able to communicate with a telecommunications network, such as the internet or a GSM network, for example. The method according to the invention comprises the steps of:

i—cyclically measuring at least one environmental operating parameter of said element;

ii—detecting that the element is operating for an excessive duration in at least one reference operating span;

iii—transmitting an alert message to the telecommunications network if the element has operated for an excessive duration in the reference operating span.

The reference operating span is determined, for example, by the operator of the telecommunications network or by the manufacturer of the element. Said span is typically a specific span to be monitored.

For example, manufacturers guarantee that their M2M elements will operate for a duration of 8 years for 5 million cycles of the $EF_{loci}$ files ("Location information", a file containing mainly the TMSI and the LAI of the element), for a moisture rate of less than 80%, an acceleration of less than 40G, and for a certain operating temperature profile. Such a manufacturer temperature profile is provided as an example in table 1 below.

TABLE 1

| Temperature range | Time condition |
|---|---|
| −50° C./0° C. | ≤20% |
| 0° C./50° C. | ≤100% |
| 50° C./120° C. | ≤20% |
| 80° C./120° C. | ≤10% |

This table shows that the M2M element in question is guaranteed by the manufacturer thereof if the following conditions are observed:

the element must operate for at most 20% of the time at a temperature of −50° C. to 0° C.;

the element operates ideally between 0° C. and 50° C.;

the element must operate for at most 20% of the time at a temperature of 50° C. to 120° C.;

the element must operate for at most 10% of the time at a temperature of 80° C. to 120° C.

The spans that require specific monitoring are thus −50° C. to 0° C., 50° C. to 120° C. and 80° C. to 120° C.

When the element detects operation for an excessive duration in at least one of said reference operating spans, it informs the telecommunications network. The network administrator can then act on the site in order to verify the operation of the apparatus in which the element is embedded or to prevent a failure of the M2M element in one way or another (replacing the element, for example). This thus makes it possible remotely to detect a future probable failure of the M2M element and/or of the apparatus in which said element is installed.

The fact of the element operating in the span from 0° C. to 50° C. is not a useful criterin in the context of the present invention, since the element has been designed precisely to operate in said span for 100% of the time.

These observations obviously also apply to measurements of excessive pressure, acceleration or moisture.

The invention thus consists of verifying that the M2M element embedded in an apparatus operates under the expected environmental conditions. This verification can be compared with an environmental template provided by the manufacturer of said element.

The alert message can be transmitted automatically to the network by the element, once the latter detects that it has operated in at least one operating span for a duration that is longer than planned. This is particularly useful if the element detects that it has operated, even if only for a few instants, outside of the previously mentioned spans, below −50° C. or above 120° C.

In another possibly complementary embodiment, the alert message is transmitted to the network at the request of the network. In this case, the network queries the element—for example regularly—to verify that there is no alert message to be transmitted.

The element is preferably a security element of the telecommunications network, such as a SIM card or the like (USIM, URIM, etc.). Security element is taken to refer to an element providing security functions in the network, such as encryption, decryption, authentication, etc.

The element is, in a first embodiment, connected to an environmental sensor, such as a simple temperature sensor. In another embodiment, the element includes a built-in environmental sensor. For example, the applicant has proposed building a temperature sensor into a SIM card.

The following description corresponds to a specific embodiment of the invention.

As shown in FIG. 1, the method according to the invention includes four main phases:

a first phase 10 of recovering (recording) a plurality of consecutive measurements Laken by the sensor;

a second phase 11 of collecting the various measurements;

a third phase 12 of comparing the collected measurements against a reference operating template including reference operating spans of the element according to time;

a fourth possible alert phase 13 which consists of notifying the telecommunications network with which the element is able to communicate if said element has operated for an excessive duration in one of the reference operating spans.

The following description relates to a situation in which an M2M element is combined with a temperature sensor.

The phase 10 of recovering measurements consists of collecting the temperature read by the temperature sensor as well as the time separating said measurement from the preceding measurement.

The security element thus collects a plurality of consecutive temperatures as well as the corresponding durations thereof. For description purposes, at an instant $t_0$, the security element measures a temperature $T_0$. At an instant $t_1=t_{0+\Delta t}$, the security element measures a temperature T1. The security element is considered to have operated at the temperature T1 for the duration $\Delta t$, which is the duration separating two consecutive measurements. Said duration can be fixed (periodic) or variable. In the next measurement instant $t_2$, the security element measures a temperature T2. The security element is considered to have operated at the temperature T2 for the duration $t_2$-$t_1$. The process thus continues in this line, alternating with the measurement collection phase, which consists of generating a table such as that shown in FIG. 2.

Said table (in two parts for easier graphic representation) shows the total operating time of the element in the various temperature ranges. Said durations are identified as D1 to D17. In general terms, M2M element manufacturers guarantee that their elements can operate for a given duration in a specific environment.

The table of FIG. 2 shows exactly how such a temperature profile can be compared. Here, temperature spans have been formed in steps of 10° C., regularly distributed between −50° C. and +120° C. This provides 17 temperature spans. Every time a temperature is measured during the first recovery phase, the measured temperature is observed in order to determine the span in which said temperature is comprised. Then, the duration separating said temperature reading from the preceding reading is added in the second line to the duration which already appears in said span. Thus, as the temperature readings are taken, a table is generated showing the durations D1 to D17 during which the element has operated in each temperature span since the element came into operation.

The fact of having a considerable number of temperature spans in the table makes it possible to obtain considerable granularity −10° C. in the present case. Said granularity can be increased or reduced as required. As an example of simplification, if the criteria to be taken into account are those of table 1, four spans of readings are enough: [−50° C.; 0° C.], [0° C.; 50° C.], [50° C.; 80° C.] and [80° C.; 120° C.]. This is explained in detail below.

The third phase of the method according to the invention consists of comparing the collected measurements with the reference operating template including reference operating spans of the element according to time. Thus, it is verified, for example as the table in FIG. 2 is populated, whether the collected measurements comply with the rules defined by the reference template. Returning to the previous example, it is thus possible to define a simple rule which consists of considering that the element has operated in the predefined spans of table 1 if:

The operating time of the element in the span [−50° C.; 0° C.] is equal to D20=D1+D2+D3+D4+D5, that of the span [0° C.; 50° C.] is equal to D30=D6+D7+D8+D9+D10, that of the span [50° C.; 80° C.] is equal to D40=D11+D12+D13, and that of the span [80° C.; 120° C.] is equal to D50=D14+D15+D16+D17.

The total operating time D is equal to D1+D2+ . . . +D17. It is therefore possible easily to determine the percentage of operating time of the element in each one of the spans. This is shown in table 2 below.

TABLE 2

| Temperature range | Time condition | Verification |
|---|---|---|
| −50° C./0° C. | ≤20% | D20/D <> 0.2? |
| 0° C./50° C. | ≤100% | D30/D <> 1? |
| 50° C./120° C. | ≤20% | D40/D <> 0.2? |
| 80° C./120° C. | ≤10% | D50/D <> 0.1? |

The third column of table 2, entitled "Verification", is a test for detecting operation of the element outside of the reference operation template. In a simplified embodiment, if the element detects that it has not operated normally in one of the spans guaranteed by its manufacturer, in other words that the element has operated in one of the reference spans for longer than the planned duration, the element transmits an alert message to the telecommunications network.

This corresponds to the fourth phase 13 of the method according to the invention, which consists of notifying the telecommunications network with which the element is able to communicate whether said element has operated for an excessive duration in one of the reference operating spans.

At the request of the network, it is also possible to record the values of the durations of operation in the various spans.

In another embodiment, a reference operating span is made up of a plurality of individual spans. For example, the alert message is transmitted to the network if the following conditions are met:

$$D1+D2>3\% \text{ AND } D15+D16+D17>5\%$$

OR $$D1+D2+D3>5\% \text{ AND } D17>1\%$$

(the logical functions are underlined)

This corresponds to the following criteria:
operation below −30° C. for more than 3% of the time AND operation above 90° C. for more than 5% % of the time,
OR operation below 20° C. for more than 5% of the time AND operation above 110° C. for more than 1% of the time.

The criteria for sending an alert message can easily be updated OTA as can the reference operating spans. The invention is advantageously presented as a simple software application operating in the element, which includes the chip to be monitored. It is preferably installed during the personalisation of a SIM card, in the chip of said card.

As previously indicated, the measurement frequency is preferably fixed for reasons of simplicity. A regular clock indicates the times when the measurements must be taken. Said clock can either be built into the element, or in a mobile terminal to which the element is connected. In the latter case, a temperature measurement can be taken every time a "status" command is launched, for example, according to which the mobile terminal regularly queries the element regarding the current state of same.

It can also be provided for the element not to be responsible for deciding to transmit an alert message to the network, and instead for the actual network to query the element from time to time in order to ask the element whether it has any anomalies to report. If this is the case, the element informs the network accordingly.

The message sent to the network preferably includes the temperatures measured in the various temperature spans. It sometimes suffices, however, only to consider the span in which the element has operated above the threshold guaranteed by the manufacturer.

The invention also relates to an element for detecting an abnormal environmental operating condition of said element. Such an element 20 is shown in FIG. 3.

The element 20 is shown herein in the form of a SIM card. Said card 20 contains a chip which it may be desirable to monitor remotely. The card 20 is therefore not only comprised in an apparatus to be tracked or controlled, but is also able to communicate with a telecommunications network. The element is thus connected by means of the contacts thereof to a mobile terminal including a conventional telecommunications means (modulator, demodulator, antenna, etc.).

According to the invention, the element 20 includes a means 22 for cyclically measuring at least one environmental operating parameter of the element 20. Said means 22 is connected here to an external sensor 21, for example a temperature sensor.

The measurement means 22 sends the measurement readings to a detection means 23. The latter is responsible for verifying whether or not the element 20 operates for an excessive duration in a reference operating span. In the event of detecting that the element 20 operates for an excessive duration in a reference operating span, the detection means 23 activates a means 24 for transmitting an alert message to the telecommunications network. The activation of said transmission means 24 results in the transmission of an alert to the network.

The detection means 23 can be updated OTA, for example in order to define new reference operating spans or to modify the frequency of the readings by the means 22.

The element according to the invention, which includes the chip whose operation is to be monitored, can be soldered to the M2M apparatus and thus becomes a resident element of the M2M device with which the chip is combined. The chip can also be included in a card, removable or not, and include an application, for example such as a Subscriber Identity Module (SIM) which makes it possible to authenticate a "subscriber" associated with the SIM card relative to a communications network such as, in particular, a mobile radio network.

The invention makes it possible to analyse whether or not the warranty conditions are fulfilled by counting the duration, during the chip warranty period, for a span of values of one or more parameters (temperature, pressure, hygrometry, acceleration, external pollution, etc.).

It should be noted that the chip according to the invention applies regardless of the packaging of the chip—the chip being bare or built into a card body, a dongle and/or any other means—and whether the chip operates alone or in conjunction with another peripheral, such as a terminal or a user terminal. Thus, the chip can be a standalone element or can be hosted by an electronic substrate which can have various shape factors.

For example, the chip can be part of a chip card, a Secure Digital (SD) card or a Multi-Media Card (MMC), or a USB (Universal Serial Bus) dongle with a chip.

The method according to the invention can be implemented by a chip as a standalone entity or by a chip which can be built into a user terminal. The user terminal can be a mobile telephone, an M2M unit or module, a smart phone, a personal digital assistant (PDA), a personal computer (PC), a notebook computer, a laptop computer, a television set, etc.

The invention as described above is described in reference to the appended drawings, and a person skilled in the art would easily contemplate other embodiments of the invention without thereby departing from the context of the claims.

The invention claimed is:

1. A method for detecting an abnormal environmental operating condition of an element embedded in an apparatus, said element being a safety element of a telecommunications network and being configured to communicate with a telecommunications network, the method comprising:
cyclically measuring at least one environmental operating parameter of said element;
detecting that the element is operating for an excessive duration in at least one reference operating span; and
transmitting an alert message to the telecommunications network when the element has operated for an excessive duration in the at least one reference operating span, wherein said transmitted alert message includes information that enables a probable future failure of at least one of said element and said apparatus to be detected.

2. A method according to claim 1, wherein said alert message is transmitted automatically by said element.

3. A method according to claim 1, wherein said alert message is transmitted at a request of said network.

4. A method according to claim 1, wherein said element is a Subscriber Identity Module (SIM) card.

5. A method according to claim 1, wherein said element is connected to at least one environmental sensor.

6. A method according to claim 1, wherein said element includes at least one environmental sensor.

7. A method according to claim 6, wherein said environmental sensor is a temperature, pressure, acceleration or hygrometry sensor.

8. A method according to claim 1, wherein the method is implemented in a Machine to Machine (M2M) environment.

9. A method according to claim 1, wherein said at least one reference operating span, and/or the duration after which it can be considered that said element is operating for an excessive duration, are updated over-the-air (OTA) in said element.

10. An element for detecting an abnormal environmental operating condition of said element, said element being embedded in an apparatus and configured to communicate with a telecommunications network, said element including:
a means for cyclically measuring at least one environmental operating parameter of said element;
a means for detecting that said element is operating for an excessive duration in at least one reference operating span; and
a means for transmitting an alert message to said telecommunications network, said transmission means being activated when said element has operated for an excessive duration in the at least one reference operating span, wherein said transmitted alert message includes information that enables a probable future failure of at least one of said element and said apparatus to be detected.

11. The element according to claim 10, wherein said element comprises a Subscriber Identity Module (SIM) card.

12. The element according to claim 10, wherein said element is of a Machine to Machine (M2M) type.

* * * * *